T. W. BRYANT.
SKATE ROLLER.
APPLICATION FILED NOV. 19, 1908.

913,687.

Patented Mar. 2, 1909.

WITNESSES
E. S. Nottingham
G. J. Downing

INVENTOR
T. W. Bryant
By H. A. Seymour
Attorney

UNITED STATES PATENT OFFICE.

THOMAS WALLACE BRYANT, OF TORRINGTON, CONNECTICUT.

SKATE-ROLLER.

No. 913,687.
Specification of Letters Patent.
Patented March 2, 1909.

Application filed November 19, 1908. Serial No. 463,387.

*To all whom it may concern:*

Be it known that I, THOMAS W. BRYANT, of Torrington, in the county of Litchfield and State of Connecticut, have invented certain new and useful Improvements in Skate-Rollers; and I do hereby declare the following to be a full, clear, and exact description of the invention, such as will enable others skilled in the art to which it appertains to make and use the same.

This invention relates to improvements in skate rollers, and more particularly to such as are made of vulcanized fiber, the object of the invention being to so construct a skate roller of the character specified that its assembling can be easily and cheaply accomplished and so that its operation shall be effectual.

A further object is to so construct a skate roller comprising a series of disks, that one of said disks shall afford an effectual backing or support for the ball casings and so that said ball casings shall serve to brace the outer disks and to also receive rivets by which the disks are secured together.

With these objects in view the invention consists in certain novel features of construction and combinations of parts as hereinafter set forth and pointed out in the claims.

Figure 1:
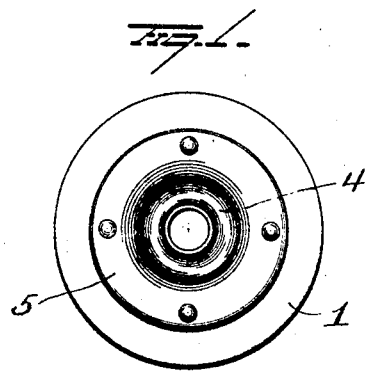
Figure 2:
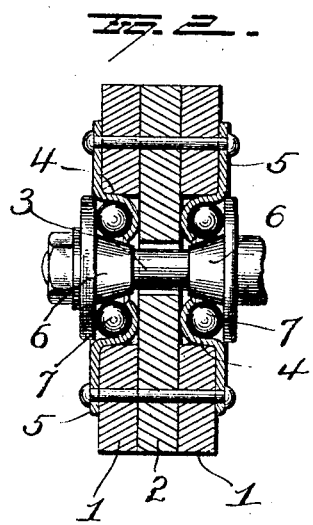

In the accompanying drawings, Figure 1 is a perspective view of a skate roller embodying my invention, and Fig. 2 is a sectional view the roller on an axle.

My improved roller comprises a series (preferably three) of vulcanized fiber disks 1, 1, and 2, placed side by side and of such thickness that, when assembled, will make a roller of the desired thickness or width. The central disk 2 is provided with a hole of sufficient size to permit the free passage of an axle 3. Each of the outer disks 1 is made with an opening of a size to receive a ball casing 4 and the thickness of each outer disk 1 is such that the ball casing can project completely through the opening therein and find a firm bearing against the central disk 2. Each ball casing is provided with a peripheral flange 5 which, in effect, serves as a face plate bearing against the outer face of each outer disk and between these flanges or face plates the disks are firmly secured by means of rivets which pass through the several disks and are upset at their respective ends against flanges or face plates 5. The flanges or face plates 5 serve to brace and support the outer disks and allow ample room for the application of the rivets which firmly hold all the parts of the structure together.

The axle 3 is provided with fixed cones 6 which coöperate with the ball casings to afford bearings for antifriction balls 7.

Having fully described my invention what I claim as new and desire to secure by Letters-Patent is,—

1. A roller comprising a series of disks having alining openings, the outer disks having openings of greater diameter than the opening in the intermediate disk, ball casings disposed in the openings of the outer disks and having bearings against the intermediate disk, and means for securing the disks together and the ball casings in place.

2. A roller comprising a series of disks having alining openings, those in the outer disks adapted to receive ball casings, ball casings seated within said openings in the outer disks and provided with peripheral flanges bearing against the outer disks and rivets passing through said flanges and disks.

3. A roller comprising a series of three vulcanized fiber disks, the central disk having an opening to permit the free passage of an axle, the outer disks having larger openings alining with the opening of the central disk, ball casings located in said larger openings of the outer disks and seated against respective faces of the intermediate disk, each of said ball casings provided with a peripheral flange disposed against the outer faces of the respective outer disks, and rivets passing through said flanges and the disks.

In testimony whereof, I have signed this specification in the presence of two subscribing witnesses.

THOMAS WALLACE BRYANT.

Witnesses:
WILLIAM CLARK,
G. NORDBERG.